(12) United States Patent
Alves Pereira et al.

(10) Patent No.: US 11,307,183 B2
(45) Date of Patent: Apr. 19, 2022

(54) METHODS FOR DETERMINATION OF POLAR PESTICIDES BY CHROMATOGRAPHY

(71) Applicant: Waters Technologies Corporation, Milford, MA (US)

(72) Inventors: Danilo Augusto Alves Pereira, Barueri (BR); Mirela Talarico Afonso De Moura, Barueri (BR); Marcella Fernanda Alves Reis, São Paulo (BR)

(73) Assignee: Waters Technologies Corporation, Milford, MA (US)

( * ) Notice: Subject to any disclaimer, the term of this patent is extended or adjusted under 35 U.S.C. 154(b) by 279 days.

(21) Appl. No.: 16/514,347

(22) Filed: Jul. 17, 2019

(65) Prior Publication Data

US 2020/0025730 A1     Jan. 23, 2020

Related U.S. Application Data

(60) Provisional application No. 62/699,985, filed on Jul. 18, 2018.

(51) Int. Cl.
*G01N 30/88*     (2006.01)
*G01N 30/72*     (2006.01)
(Continued)

(52) U.S. Cl.
CPC .......... *G01N 30/88* (2013.01); *G01N 30/482* (2013.01); *G01N 30/72* (2013.01); *G01N 2030/027* (2013.01); *G01N 2030/884* (2013.01)

(58) Field of Classification Search
CPC ...... G01N 30/88; G01N 30/72; G01N 30/482; G01N 2030/884; G01N 2030/027; G01N 30/7206
(Continued)

(56) References Cited

U.S. PATENT DOCUMENTS

| 4,017,528 A | 4/1977 | Unger et al. |
| 6,528,167 B2 | 3/2003 | O'Gara |

(Continued)

FOREIGN PATENT DOCUMENTS

| EP | 3184157 A1 | 6/2017 |
| WO | 2016026286 A1 | 2/2016 |

OTHER PUBLICATIONS

"Ion Chromatography." Thermo Fisher Scientific. Retrieved on Jul. 24, 2019. <https://www.mayomedicallaboratories.com/test-catalog/Overview/80289>.

(Continued)

*Primary Examiner* — Robert R Raevis
(74) *Attorney, Agent, or Firm* — Womble Bond Dickinson (US) LLP; Deborah M. Vernon; Mark R. DeLuca

(57) ABSTRACT

The disclosure relates to a reversed-phase chromatography method for the determination of at least one of glyphosate or AMPA in a sample. The method includes obtaining the sample comprising the at least one of glyphosate or AMPA in a sample matrix and introducing the sample to a reversed-phase chromatography system. The reversed-phase chromatography system includes a reversed-phase column having a stationary phase material contained inside the column. The stationary phase material includes a phenyl functional group. The method also includes flowing the sample with a mobile phase eluent through the reversed-phase column, wherein the at least one of glyphosate or AMPA is substantially resolved and retained. The mobile phase eluent has a pH between about 1.5 to about 2.5. The at least one of glyphosate or AMPA are detected using a detector.

18 Claims, 15 Drawing Sheets

(51) Int. Cl.
*B01J 20/281* (2006.01)
*G01N 30/02* (2006.01)

(58) Field of Classification Search
USPC ............... 73/61.52–61.58; 422/70; 210/656; 436/161
See application file for complete search history.

(56) References Cited

U.S. PATENT DOCUMENTS

| | | | |
|---|---|---|---|
| 6,686,035 | B2 | 2/2004 | Jiang et al. |
| 7,175,913 | B2 | 2/2007 | O'Gara |
| 2012/0226054 | A1* | 9/2012 | Miller ............... B01J 20/28078 549/286 |
| 2013/0319086 | A1 | 12/2013 | Wyndham et al. |
| 2016/0238573 | A1* | 8/2016 | Venkatramani .... B01D 15/1885 |
| 2018/0259494 | A1 | 9/2018 | Shah et al. |

OTHER PUBLICATIONS

"Test ID: MMAS: Methylmalonic Acid (MMA), Quantitative, Serum." Mayo Clinic Laboratories. Retrieved on Jul. 24, 2019. https://www.mayocliniclabs.com/test-catalog/Overview/80289.

Fiori et al. "Cellular and mitochondrial determination of low molecular mass organic acids by LC-MS/MS." J. Pharma. Biomed. Anal. 150(2018): 33-38.

Gritti et al. "Adsorption behaviors of neutral and ionizable compounds on hybrid stationary phases in the absence (BEH-C18) and the presence (CSH-C18) of immmobile surface charges." J. Chromatogr. A. 1282(2013): 58-71.

Gtitti et al. "Effect of the ionic strength on the adsorption process of an ionic surfactant onto a C18-bonded charged surface hybrid stationary phases at low pH." J. Chromatogr. A. 1282(2013): 46-57.

Gritti et al. "Effect of the pH and the ionic strength on overloaded band profiles of weak bases onto neutral and charged surface hybrid stationary phases in reversed-phase liquid chromatography." J. Chromatogr. A. 1282(2013): 113-126.

Iraneta et al. "A Review of Waters Hybrid Particle Technology. Part 3. Charged Surface Hybrid (CSH) Technology and Its Use in Liquid Chromtography." Waters white paper 720003929en. 2011.

Michopoulos et al. "Targeted profiling of polar intracellular metabolites using ion-pair-high performance liquid chromatography and -ultra high performance liquid chromatography coupled to tandem mass spectrometry: Applications to serum, urine and tissue extracts." J. Chromatogr. A. 1349(2014): 60-68.

"EPA Method 547: Determination of Glyphosate in Drinking Water by Direct-Aqueous Injection HPLC, Post-Column Derivatization and Fluorescence Detection." Waters Application Notes 720006246en. (2008).

"Guidance document on analytical quality and method validation procedures for pesticide residue analysis in food and feed." Sante, Commission of the European Communities (2015) Document No. Sante/11945/2015. Rev. 0, implemented by Jan. 1, 2016.

"Water quality—Determination of glyphosate and AMPA—Method using high performance liquid chromatography (HPLC) with tandem mass spectrometric detection." International Standard: ISO 16308:2014(E). Sep. 15, 2014.

Anastassiades et al. "Quick Method for the Analysis of Numerous Highly Polar Pesticides in Foods of Plant Origin via LC-MS/MS involving Simultaneous Extraction with Methanol (QuPPE-Method)." Version 9.3 (Aug. 2017, Document History, see p. 73). EURL-SRM: EU Reference Laboratories for Residues of Pesticides: Single Residue Methods.

Bajad et al. "Separation and quantitation of water soluble cellular metabolites by hydrophilic interaction chromatography-tandem mass spectrometry." J. Chromatogr. A. 1125(2006):76-88.

Chamkasem, et al., "Direct Determination of Glyphosate, Glufosiante, and AMPA in Soybean and Corn by Liquid Chromatography/Tandem Mass Spectrometry," Analytical and Bioanalytical Chemistry, Research Paper (2016).

Chunyan, et al., "Direct Aqueous Determination of Glyphosate and Related Compounds by Liquid Chromatography/Tandem Mass Spectrometry using Reversed-Phase and Weak Anion-Exchange Mixed-Mode Column," Journal of Chromatography A, 1218 (2011) 5638-5643.

Fussell et al. "Analysis of Polar Ionic Pesticides by IC-MS: Possible Solution to a Long-Standing Problematic Analysis?" Thermo Scientific. 2017. <http://tools.thermofisher.com/content/sfs/posters/PO-72369-IC-MS-Polar-Ionic-Pesticides-ASMS2017-PO72369-EN.pdf>.

Hinder et al. "Decreased glycolytic and tricarboxylic acid cycle intermediate coincide with peripheral nervous system oxidative stress in a murine model of type 2 diabetes." J. Endocrinol 216(2013): 1-11.

International Search Report and Written Opinion relating to International Application No. PCT/IB2018/051486, 15 Pages, dated Jun. 13, 2018.

Lu et al. "Metabolomic Analysis via Reversed-Phase Ion-Pairing Liquid Chromatography Coupled to a Stand Alone Orbitrap Mass Spectrometer." Anal. Chem. 82(2010): 3212-3221.

Luo et al. "Simultaneous determination of multiple intracellular metabolites in glycolysis, pentose phosphate pathway and tricarboxylic acid cycle by liquid chromatography-mass spectrometry." J. Chromtogr. A. 1147(2007): 153-164.

Mallet. "Analysis of Glysophase, Glufosinate, and AMPA in Tap and Surface Water Using Open-Architecture UPLC with 2D-LC Technology." Waters Application Notes 720005169en. (2014).

Masia, et al., "Determination of Pesticides and Veterinary Drug Residues in Food by Liquid Chromatography-Mass Spectrometry: A Review," Analytica Chimica Acta 936 (2016) 40-61.

Melo et al. "Brief Review Analytical Methods for the Determination of Glyphosate." MOJ Toxicol. 4.2(2018): 00088.

Pihlström, et al., Revisions to Document No. Sante /2013 / 12571 titled, "Analytical Quality Control and Method Validation Procedures for Pesticide Residues Analysis in Food and Feed," 48 Pages, Jan. 1, 2016.

Rustin et al. "Inborn errors of the Krebs cycle: a group of unusual mitochondrial diseases in human." Biochim. Biophys. Acta. 1361(1997): 185-197.

Steinborn, et al., "Determination of Glyphosate Levels in Breast Milk Samples from Germany by LC-MS/MS and GC-MS/MS," J. Agric. Food Chem. (2016), 64, 1414-1421.

Tan et al. "Derivatization of the tricarboxylic acid intermediates with O-benzylhydroxylamine for liquid chromatography-tandem mass spectrometry detection." Anal. Biochem. 465(2014): 134-147.

Van Genderen-de Kloe et al. "Analysis of Glyphoste, AMPA, and Glufosinate in Water Using UPLC-MS/MS." Waters Application Notes 720006246en. (2018).

Waters Corporation, "Controlling Contamination in LC/MS Systems—Best Practices," 715001307 Rev. G, 33 Pages, (2016).

Winfield et al. "Method 547: Determiantion of Glyphosate in Drinking Water by Direct-Aqueous Injection HPLC, Post-Column Derivatization and Fluorescence Detection." U.S. Environmental Protection Agency: Enivironmental Monitoring Systems Laboratory, Office of Research and Development. Jul. 1990.

Wuyts, et al., "Highly Sensitve Analysis of Polar Pesticides in Food Matrices on the Xevo TQ-XS," Waters Corporation Technology Brief, (Oct. 2016).

Yang et al. "Analysis of Glyphosate and AMPA in Environmental Water by Ion Chromatography Electrospray Tandem Mass Spectrometry (IC-ESI-MS/MS)." Thermo Scientific: Application Note: 491. 2010.

Yoshioka et al. "Rapid determination of glyphosate, glufosinate, bialaphos, and their major metabolites in serum by liquid chromatography-tandem mass spectrometry using hydrophilic interaction chromatography." J. Chromatogr. A. 1218(2011):3675-3680.

Smith et al., ed. "March's Advanced Organic Chemistry." Seventh Edition. Hoboken, NJ: John Wiley & Sons. (2007): 1-2357.

\* cited by examiner

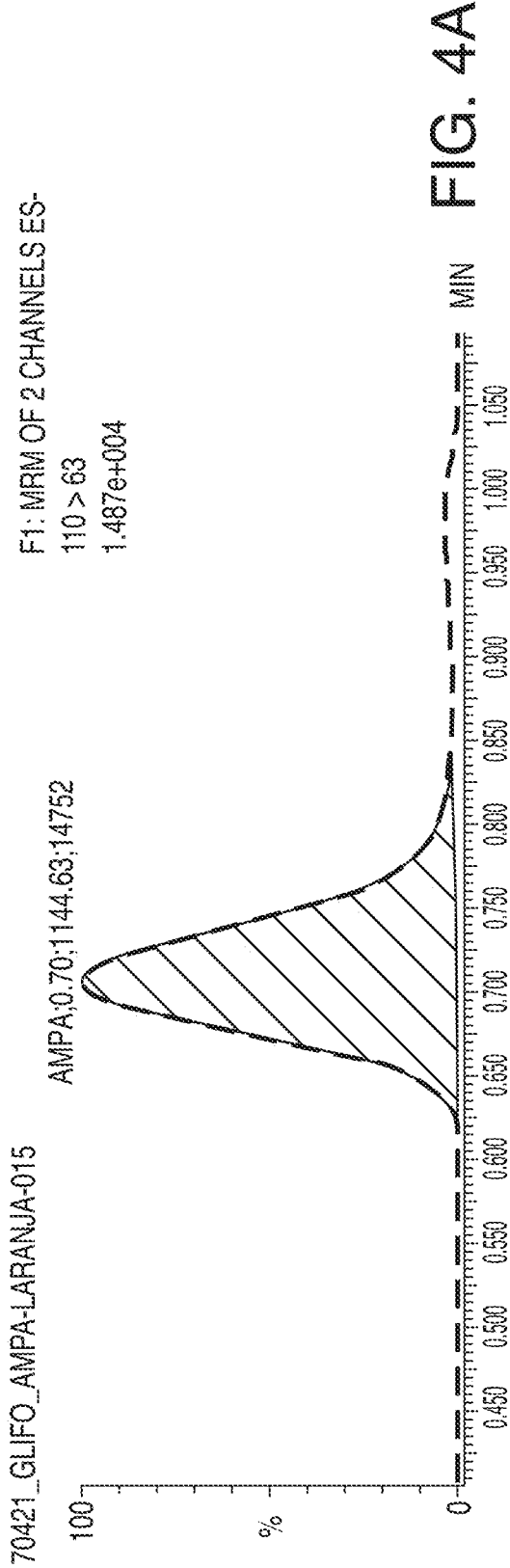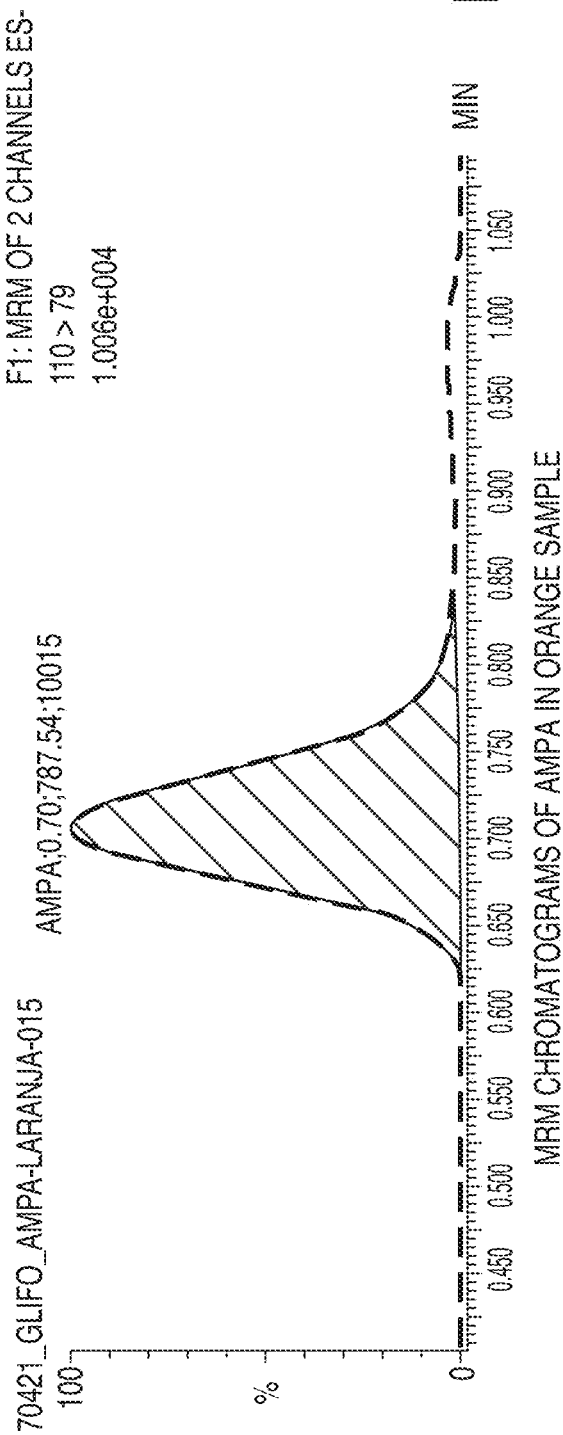
MRM CHROMATOGRAMS OF AMPA IN ORANGE SAMPLE
FIG. 4A
FIG. 4B

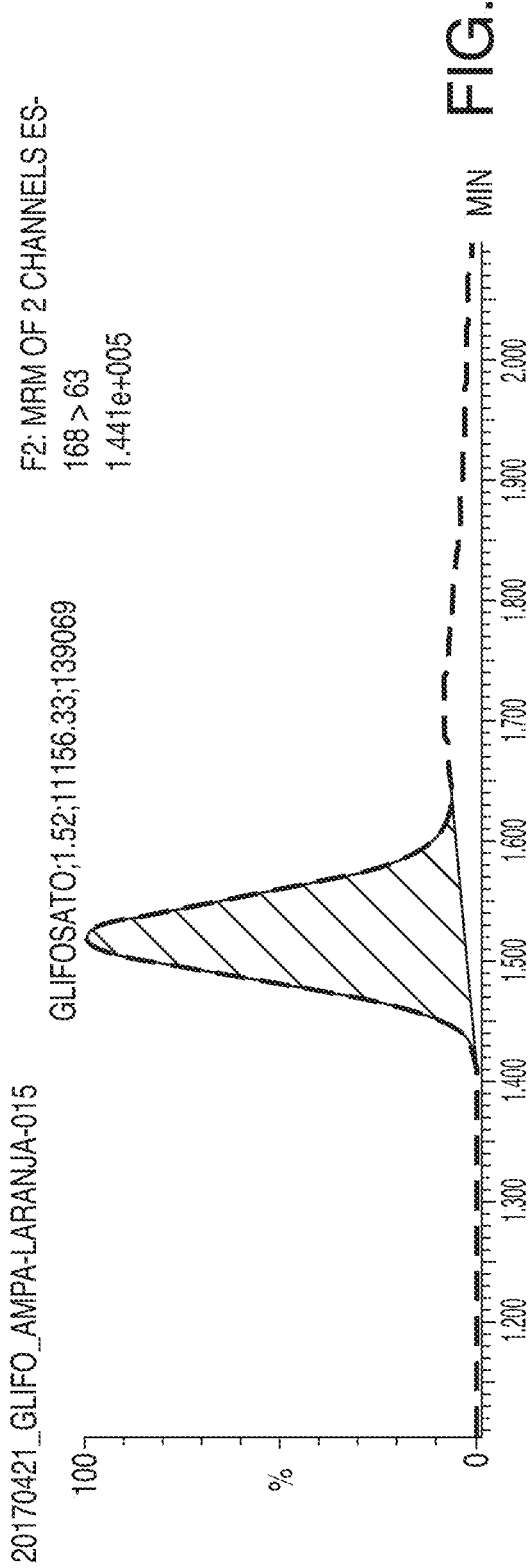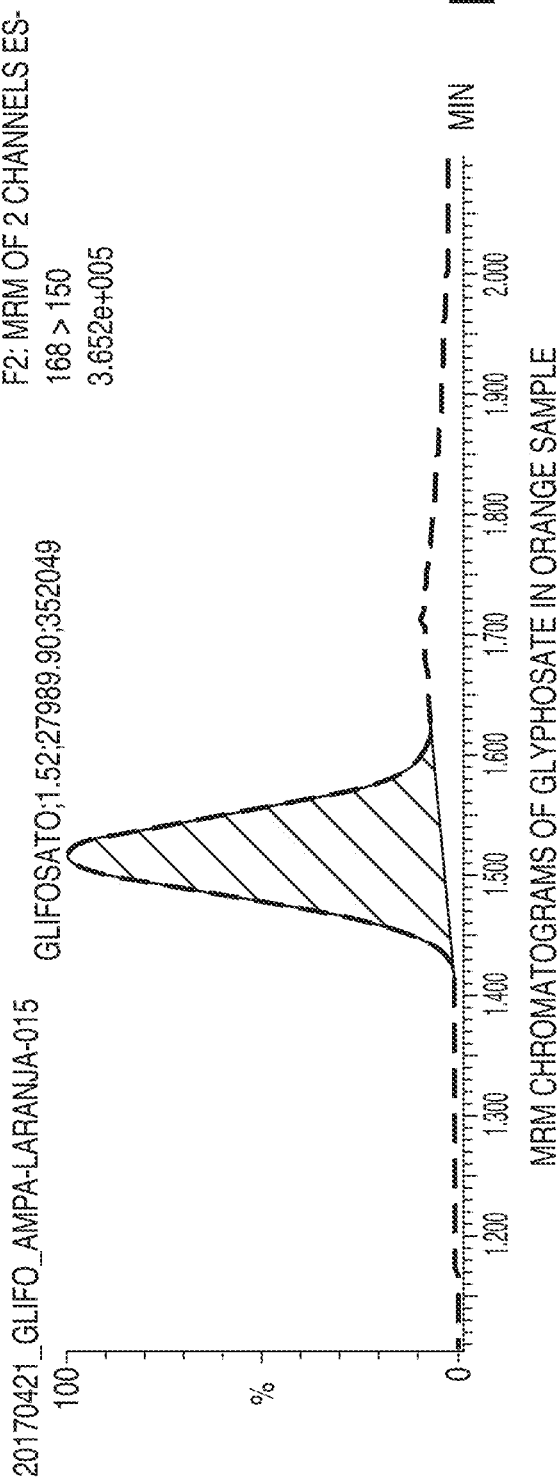

MRM CHROMATOGRAMS OF AMPA IN TOMATO SAMPLE

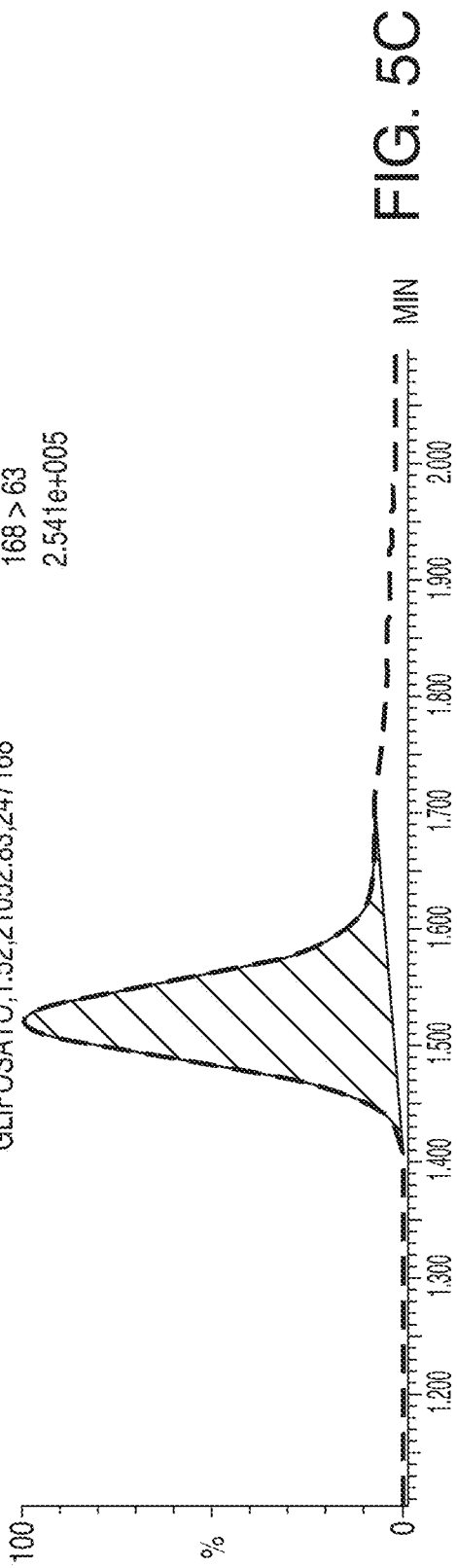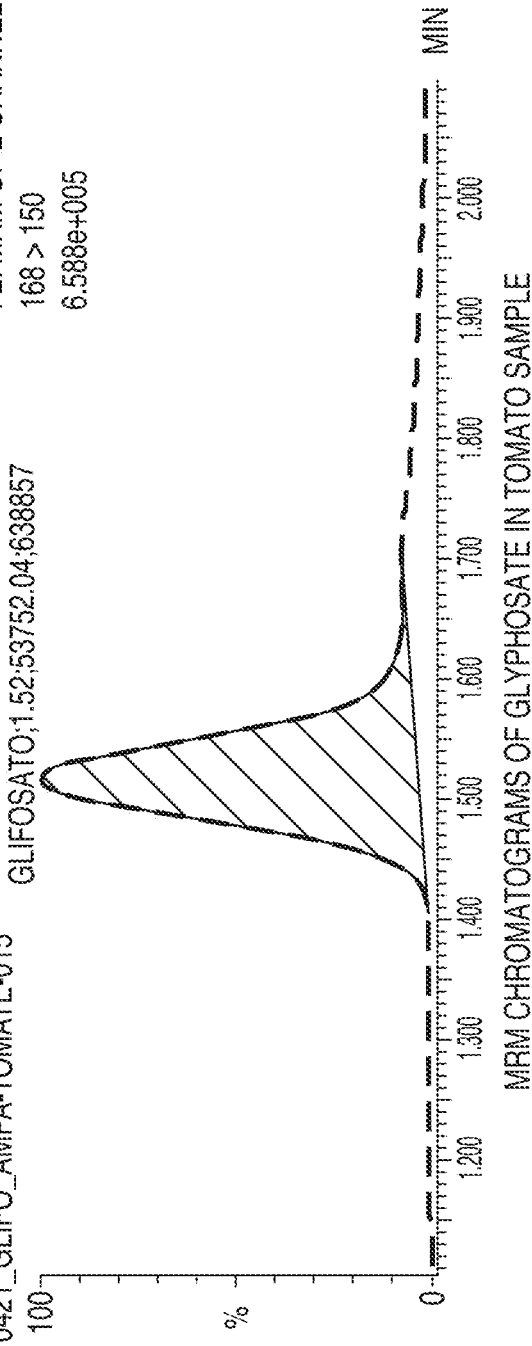
MRM CHROMATOGRAMS OF GLYPHOSATE IN TOMATO SAMPLE

MRM CHROMATOGRAMS OF AMPA IN SOYBEAN SAMPLE

MRM CHROMATOGRAMS OF GLYPHOSATE IN SOYBEAN SAMPLE

MATRIX MATCHED CALIBRATION CURVES OF AMPA IN ORANGE SAMPLE

MATRIX MATCHED CALIBRATION CURVES OF GLYPHOSATE IN ORANGE SAMPLE

MATRIX MATCHED CALIBRATION CURVES OF AMPA IN TOMATO SAMPLE

MATRIX MATCHED CALIBRATION CURVES OF GLYPHOSATE IN TOMATO SAMPLE

MATRIX MATCHED CALIBRATION CURVES OF AMPA IN SOYBEAN SAMPLE

MATRIX MATCHED CALIBRATION CURVES OF GLYPHOSATE IN SOYBEAN SAMPLE

METHODS FOR DETERMINATION OF POLAR PESTICIDES BY CHROMATOGRAPHY

CROSS-REFERENCE TO RELATED APPLICATIONS

This application claims the benefit of and priority to U.S. provisional patent application No. 62/699,985 filed Jul. 18, 2018, the entire contents of which is incorporated herein by reference.

FIELD OF THE TECHNOLOGY

The present disclosure relates to methods for the determination of polar pesticides by chromatography. More specifically, the present disclosure relates to reversed-phase chromatography methods for the determination of glyphosate or AMPA in a sample without the use of derivatization.

BACKGROUND

In view of the growing food demand, it is increasingly necessary to increase food production with quality. In this way, the use of agricultural defenders (e.g., pesticides) is indispensable. However, the use of pesticides causes the accumulation of these substances in soils and food. Consequently, adsorption occurs in soil and leaching leads to residues in surface waters.

Glyphosate (N-(phosphonomethyl)glycine) is found in a class of herbicides and prevents the flowering of weeds in the field, for example, in crops of irrigated rice, coffee, sugarcane, corn and others. Classified as non-selective and systemic, glyphosate features high efficiency and low toxicity. The main metabolite of glyphosate is known as AMPA (aminomethylphosphonic acid) and has similar characteristics to glyphosate, but AMPA is must more persistent in the environment.

One method of analysis of glyphosate and AMPA involves derivatization, by which both molecules are converted into less polar substances of similar structure, allowing greater retention in reversed-phase chromatography and also enabling fluorimetric detection. However, derivatization is time consuming and costly. Moreover, the determination of glyphosate and AMPA is difficult due to low residue levels, their amphoteric character, low molecular mass and lack of chemical groups for detection.

SUMMARY

The present technology solves the problems of the prior art by providing a reversed-phase chromatography method for the determination of glyphosate or AMPA in a sample without the use of derivatization. This can be done by the use of stationary phase material that includes a phenyl functional group. The method provides differential selectivity and exceptional peak retention and shape. Moreover, the use of tandem mass spectrometry (MS/MS) provides robustness in the monitoring of selected reactions resulting in increased sensitivity and selectivity.

The present disclosure relates to a reversed-phase chromatography method for the determination of glyphosate or AMPA in a sample. The method includes obtaining the sample comprising at least one of glyphosate or AMPA in a sample matrix and introducing the sample to a reversed-phase chromatography system. The reversed-phase chromatography system includes a reversed-phase column having a stationary phase material contained inside the column. The stationary phase material includes a phenyl functional group. The method also includes flowing the sample with a mobile phase eluent through the reversed-phase column, wherein the at least one of glyphosate or AMPA is substantially resolved and retained. The mobile phase eluent has a pH between about 1.5 to about 2.5. The at least one of glyphosate or AMPA are detected using a detector. The reversed-phase chromatography method can include one or more of the following embodiments.

In one embodiment, the pH of the mobile phase eluent is about 2.

The stationary phase material can include a fluoro-phenyl functional group. In some embodiments, the stationary phase material includes inorganic/organic hybrid particles. The stationary phase material can include ethylene bridged hybrid particles.

In some embodiments, the reversed-phase chromatography method also includes extracting the at least one of glyphosate and/or AMPA from the sample before introducing the extracted sample to the reversed-phase chromatography system. The at least one of glyphosate and/or AMPA can be extracted using an organic solvent acidified with formic acid.

In some embodiments, the sample includes glyphosate and AMPA.

The mobile phase eluent can be acetic acid.

The glyphosate and/or AMPA can be separated in less than two minutes. In some embodiments, the AMPA is separated in less than one minute.

The detector can be a mass spectrometer. In some embodiments, the detector is a tandem mass spectrometer (MS/MS).

In some embodiments, the mobile phase eluent has a flow rate between about 0.2 to about 1.0 mL/min. The mobile phase eluent can have a flow rate of about 0.40 mL/min.

The reversed-phase chromatography system can be operated under isocratic conditions.

In some embodiments, the sample is a fruit sample, a vegetable sample or a soil sample. For example, the sample can be an orange sample, a tomato sample or a soybean sample.

In one aspect the technology relates to a kit that includes a reversed-phase chromatography system. The reversed-phase chromatography system includes a reversed phase column having a stationary phase material contained inside the column. The stationary phase material includes a phenyl functional group. The reversed-phase chromatography system also includes a detector. The kit also includes instructions for (a) obtaining a sample comprising at least one of glyphosate or AMPA in a sample matrix; (b) introducing the sample to the reversed-phase chromatography system; (c) flowing the sample with a mobile phase eluent through the reversed-phase column, wherein the at least one of glyphosate or AMPA is substantially resolved and retained, the mobile phase eluent having a pH between about 1.5 to about 2.5; and (d) detecting the at least one of glyphosate or AMPA using a detector. The kit can include one or more of the embodiments described herein.

In another aspect, the technology relates to a kit that includes a reversed-phase chromatography column having a stationary phase material contained inside the column. The stationary phase material includes a phenyl functional group. The kit also includes instructions contained in a computer readable medium for operating a reversed-phased chromatography system. The instructions automate inserting a sample into a mobile phase eluent, flowing the sample with the mobile phase eluent through the reversed-phase chromatography column, and detecting components of the sample. The kit also includes a vial containing the mobile phase eluent acidified to a pH of about 2. The kit can include one or more of the embodiments described herein.

The embodiments of the present disclosure provide advantages over the prior art by providing simple methods for the determination of at least one of glyphosate and AMPA in complex samples using phenyl based reversed-phase chemistry with no derivatization needed while providing high sensitivity and selectivity.

BRIEF DESCRIPTION OF THE DRAWINGS

The technology will be more fully understood from the following detailed description taken in conjunction with the accompanying drawings, in which:

FIGS. 4A-D show MRM chromatograms of AMPA (FIGS. 4A and 4B) and glyphosate (FIGS. 4C and 4D) monitored in orange, samples, according to an illustrative embodiment of the technology.

FIGS. 5A-D show MRM chromatograms of AMPA (FIGS. 5A and 5B) and glyphosate (FIGS. 5C and 5D) monitored in tomato samples, according to an illustrative embodiment of the technology.

DETAILED DESCRIPTION

Figure 1:
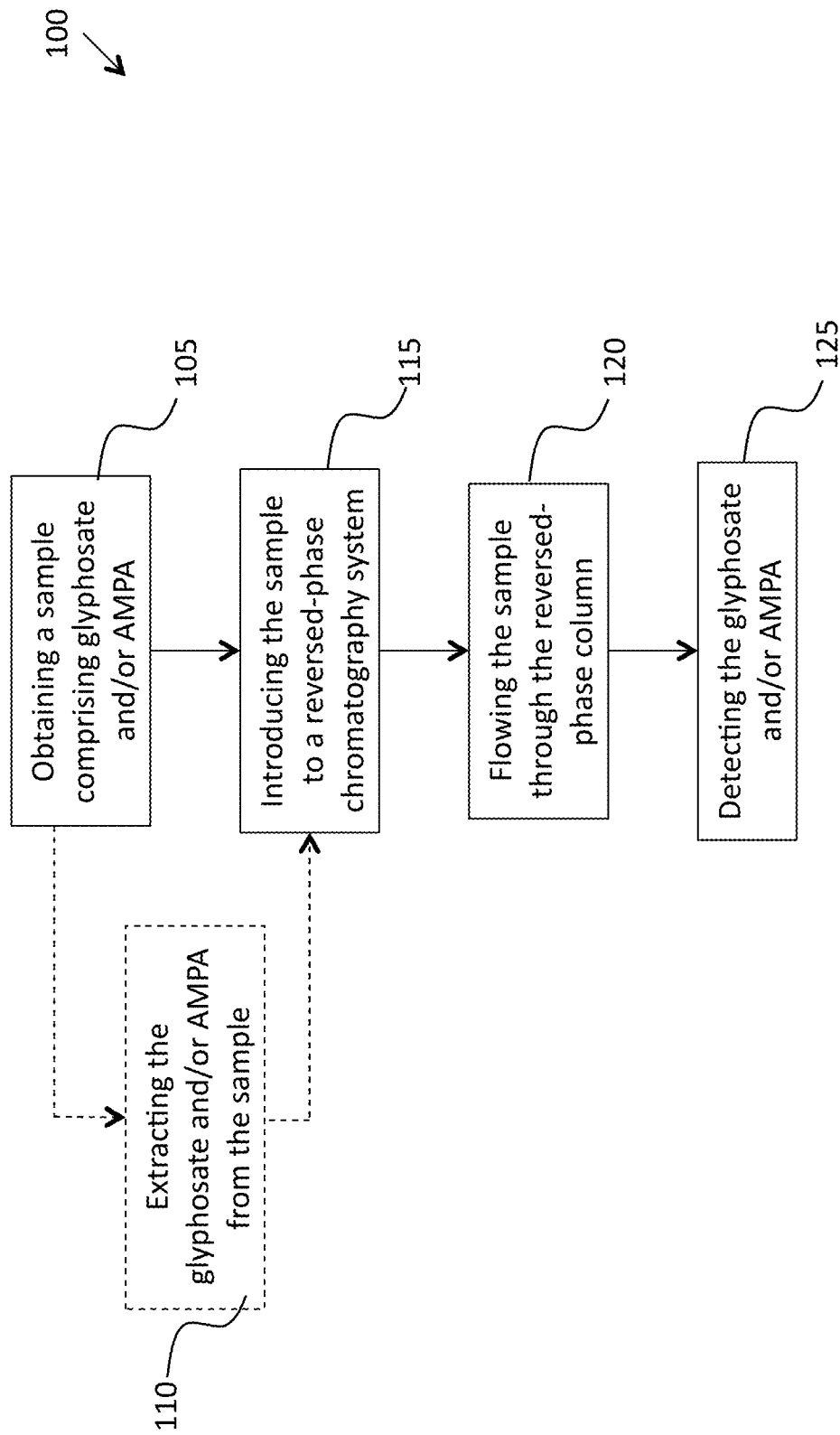
FIG. 1 is a flow chart of a reversed-phase chromatography method for the determination of glyphosate and/or AMPA in a sample, according to an illustrative embodiment of the technology.

The technology relates to a method for the extraction and determination of polar pesticides, in particular, glyphosate and AMPA, in food or soil samples by reversed phase liquid chromatography and MS/MS detection. The combination of simple sample extraction with high performance reversed-phase liquid chromatography using a stationary phase having a phenyl functional group allows for the determination of challenging analytes in complex matrices and at low levels.

As used herein, the term "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments.

As used herein, the term "chromatographic surface" includes a surface which provides for chromatographic separation of a sample. In certain aspects, the chromatographic surface is porous. In some aspects, a chromatographic surface can be the surface of a particle, a superficially porous material or a monolith. In certain aspects, the chromatographic surface is composed of the surface of one or more particles, superficially porous materials or monoliths used in combination during a chromatographic separation. In certain other aspects, the chromatographic surface is non-porous.

As used herein, the term "ionizable modifier" includes a functional group which bears an electron donating or electron withdrawing group. In certain aspects, the ionizable modifier contains one or more carboxylic acid groups, amino groups, imido groups, amido groups, pyridyl groups, imidazolyl groups, ureido groups, thionyl-ureido groups or aminosilane groups, or a combination thereof. In other aspects, the ionizable modifier contains a group bearing a nitrogen or phosphorous atom having a free electron lone pair. In certain aspects, the ionizable modifier is covalently attached to the material surface and has an ionizable group. In some instances it is attached to the chromatographic material by chemical modification of a surface hybrid group.

As used herein, the term "hydrophobic surface group" includes a surface group on the chromatographic surface which exhibits hydrophobicity. For example, the hydrophobic group can be unsubstituted and substituted phenyl groups, a fluoro-phenyl, or phenyl-hexyl functional group bonding and/or coatings.

As used herein, the term "hybrid", including "hybrid inorganic/organic material," includes inorganic-based structures wherein an organic functionality is integral to both the internal or "skeletal" inorganic structure as well as the hybrid material surface. The inorganic portion of the hybrid material may be, e.g., alumina, silica, titanium, cerium, or zirconium or oxides thereof, or ceramic material.

"Hybrid" includes inorganic-based structures wherein an organic functionality is integral to both the internal or "skeletal" inorganic structure as well as the hybrid material surface. As noted above, exemplary hybrid materials are shown in U.S. Pat. Nos. 4,017,528, 6,528,167, 6,686,035 and 7,175,913, the contents of each of which are incorporated hereby by reference.

As used herein, the term "surface modifiers" include (typically) organic functional groups which impart a certain chromatographic functionality to a chromatographic stationary phase. The porous inorganic/organic hybrid materials possess both organic groups and silanol groups which may additionally be substituted or derivatized with a surface modifier.

The language "surface modified" is used herein to describe the composite material of the present technology that possess both organic groups and silanol groups which may additionally be substituted or derivatized with a surface modifier. "Surface modifiers" include (typically) organic functional groups which impart a certain chromatographic functionality to a chromatographic stationary phase. Surface modifiers such as disclosed herein are attached to the base material, e.g., via derivatization or coating and later cross-linking, imparting the chemical character of the surface modifier to the base material. In one embodiment, the organic groups of a hybrid material, react to form an organic covalent bond with a surface modifier. The modifiers can form an organic covalent bond to the material's organic group via a number of mechanisms well known in organic and polymer chemistry including but not limited to nucleophilic, electrophilic, cycloaddition, free-radical, carbene, nitrene, and carbocation reactions. Organic covalent bonds are defined to involve the formation of a covalent bond between the common elements of organic chemistry including but not limited to hydrogen, boron, carbon, nitrogen, oxygen, silicon, phosphorus, sulfur, and the halogens. In addition, carbon-silicon and carbon-oxygen-silicon bonds are defined as organic covalent bonds, whereas silicon-oxygen-silicon bonds that are not defined as organic covalent bonds. A variety of synthetic transformations are well known in the literature, see, e.g., March, *J. Advanced Organic Chemistry*, 3rd Edition, Wiley, New York, 1985.

FIG. 1 is a flow chart of a reversed-phase chromatography method 100 for the determination of glyphosate or AMPA in a sample. The reversed-phase chromatography method 100 includes obtaining a sample that includes the glyphosate and/or AMPA in a sample matrix 105. In some embodiments, the sample includes both glyphosate and AMPA. In other embodiments, the sample includes one of glyphosate or AMPA. The sample can be a food sample, for example, a fruit sample or a vegetable sample. In some embodiments the sample is a soil sample.

After the sample is obtained, the glyphosate and/or AMPA can be extracted from the sample 110. Extracting the polar pesticides from the sample isolates the polar pesticides from the rest of the sample. Numerous extraction techniques can be used and are known to those of skill in the art, including QuPPe (Quick Polar Pesticides Methods) and modifications thereof, and similar aqueous methods. The method can also include an extraction method to purify and/or concentrate the polar pesticide (i.e., glyphosate and/or AMPA) from the sample. In some embodiments, the glyphosate and/or AMPA is extracted using an organic solvent that is acidified with formic acid. The organic solvent can be, for example, methanol, acetonitrile, and/or water.

Figure 2:
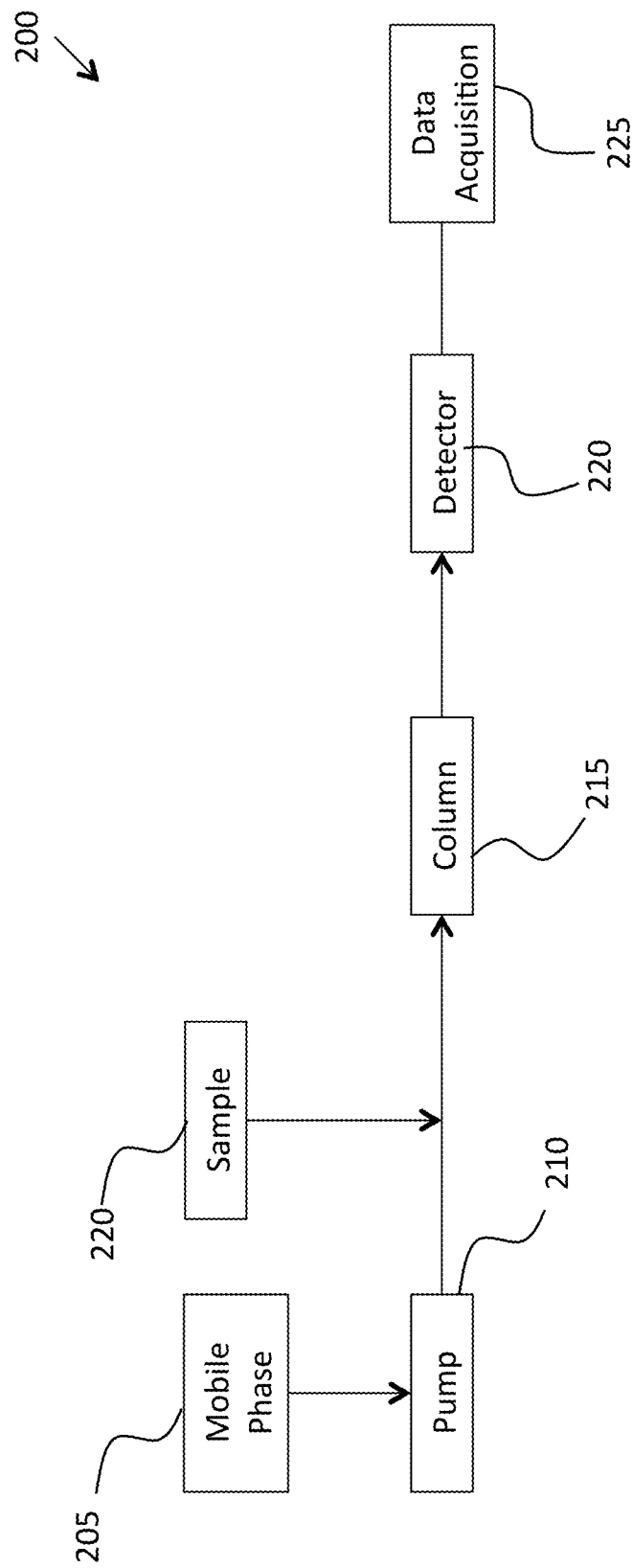
FIG. 2 is a schematic of a reversed-phase chromatography system, according to an illustrative embodiment of the technology.

The sample is introduced 115 to a reversed-phase chromatography system. FIG. 2 is a schematic of an exemplary reversed-phase chromatography system 200. The reversed-phase chromatography system 200 includes a mobile phase reservoir 205 that stores a mobile phase eluent. A pump 210, pumps the mobile phase eluent from the mobile phase reservoir 205 to the reversed-phase chromatography column 215. A sample 220 is introduced into the mobile phase eluent flow stream prior to the reversed-phase chromatography column 215. The sample 220 and the mobile phase combine prior to entering the reversed-phase chromatography column 215, and form a combined flow stream. The mobile phase eluent has a pH between about 1.5 to about 2.5. In some embodiments the pH of the mobile phase eluent is about 2. The pH of the mobile phase eluent can be 1.5, 1.6, 1.7, 1.8, 1.9, 2.0, 2.1, 2.2, 2.3, 2.4 or 2.5. These values can be used to define a range. In some embodiments the mobile phase eluent is acetic acid. The mobile phase eluent can be, for example, methanol acidified with acetic acid, acetonitrile acidified with acetic acid, isopropanol acidified with acetic acid and/or water acidified with acetic acid.

The reversed-phase chromatography column 215 contains a stationary phase inside the column 215. The stationary phase is hydrophobic and contains a phenyl functional group. The phenyl functional group can include unsubstituted and substituted phenyl groups. The stationary phase can include a fluoro-phenyl functional group or a phenyl-hexyl functional group. The stationary phase material can include inorganic/organic hybrid particles or ethylene bridged hybrid particles. The mean particle size can measure about 0.1 µm, 0.2 µm, 0.3 µm, 0.4 µm, 0.5 µm, 0.6 µm, 0.7 µm, 0.8 µm, 0.9 µm, 1.0 µm, 1.1 µm, 1.2 µm, 1.3 µm, 1.4 µm, 1.5 µm, 1.6 µm, 1.7 µm, 1.8, µm, 1.9 µm, 2.0 µm, 2.1 µm, 2.2 µm, 2.3 µm, 2.4 µm, 2.5 µm, 2.6 µm, 2.7 µm, 2.8 µm, 2.9 µm, 3.0 µm, 3.1 µm, 3.2 µm, 3.3 µm, 3.4 µm, 3.5 µm, 3.6 µm, 3.7 µm, 3.8 µm, 3.9 µm, 4.0 µm, 4.1 µm, 4.2 µm, 4.3 µm, 4.4 µm, 4.5 µm, 4.6 µm, 4.7 µm, 4.8 µm, 4.9 µm, 5.0 µm, 5.1 µm, 5.2 µm, 5.3 µm, 5.4 µm, 5.5 µm, 5.6 µm, 5.7 µm, 5.8 µm, 5.9 µm, 6.0 µm, 6.5 µm, 7.0 µm, 7.5 µm, 8.0 µm, 8.5 µm, 9.0 µm, 9.5 µm, 10.0 µm, 10.5 µm, 11.0 µm, 11.5 µm, 12.0 µm, 12.5 µm, 13.0 µm, 13.5 µm, 14.0 µm, 14.5 µm, or 15 µm. These values can define a range. In one embodiment, the particle size is about 5.0 µm.

The functional group imparts a certain chromatographic functionality to a chromatographic stationary phase material (e.g., an inorganic/organic hybrid particles that possesses both organic groups and silanol groups which can additionally be substituted or derivatized). The functional group can be a hydrophobic surface group. The hydrophobic surface group (e.g., the fluoro-phenyl or phenyl-hexyl functional group) is attached to the base material (particle), for example, via derivatization or coating and later crosslinking, imparting the chemical character of the hydrophobic surface group to the base material (e.g., the inorganic/organic hybrid particles or ethylene bridged hybrid particles described above).

Examples of these functional groups/hydrophobic groups are shown below.

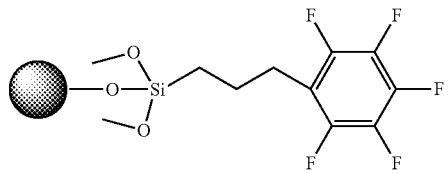 [SMILES: CO[Si](CCCc1c(F)c(F)c(F)c(F)c1F)(OC)OC]

Example of a stationary phase having a fluoro-phenyl functional group.

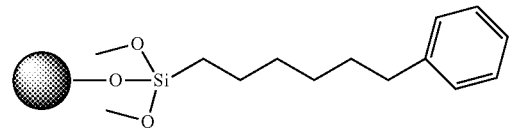 [SMILES: CO[Si](CCCCCCc1ccccc1)(OC)OC]

Example of a stationary phase having a phenyl-hexyl functional group.

These functional groups can be applied to a base particle using a variety of methods. For example, starting with an unbonded based particle (e.g., ethylene bridged hybrid particle (BEH)), a small controlled charged can be applied to the BEH particle surface. The resulting charged surface hybrid (CSH) particle can be then bonded and sometimes endcapped with the functional group, for example, a fluoro-phenyl functional group or a phenyl-hexyl functional group.

The charged surface hybrid reversed phase sorbents applicable to these separations have been defined in United States Patent Publication Number 20130319086A1 entitled "High Purity Chromatographic Materials Comprising an Ionizable Modifier" the contents of which is incorporated herein by reference in its entirety. In brief, a charged surface reversed phase material is a high purity chromatographic material (HPCM) having a chromatographic surface comprised of a hydrophobic surface group and one or more ionizable modifiers. These charged surface reversed phase materials can have a ratio of hydrophobic surface group:ionizable modifier in the HPCM from about 2.5:1 to about 350:1. In some embodiments, the ratio of hydrophobic surface group:ionizable modifier is between about 4:1 to about 350:1 or from about 4:1 to about 22:1 or from about 5:1 to about 22:1. The charged surface reversed phase materials can have a concentration of ionizable modifier in the HPCM that is less than about 0.5 µmol/m$^2$. In some embodiments, the concentration of ionizable modifier is between about 0.03 µmol/m$^2$ and 0.5 µmol/m$^2$.

Figure 3:
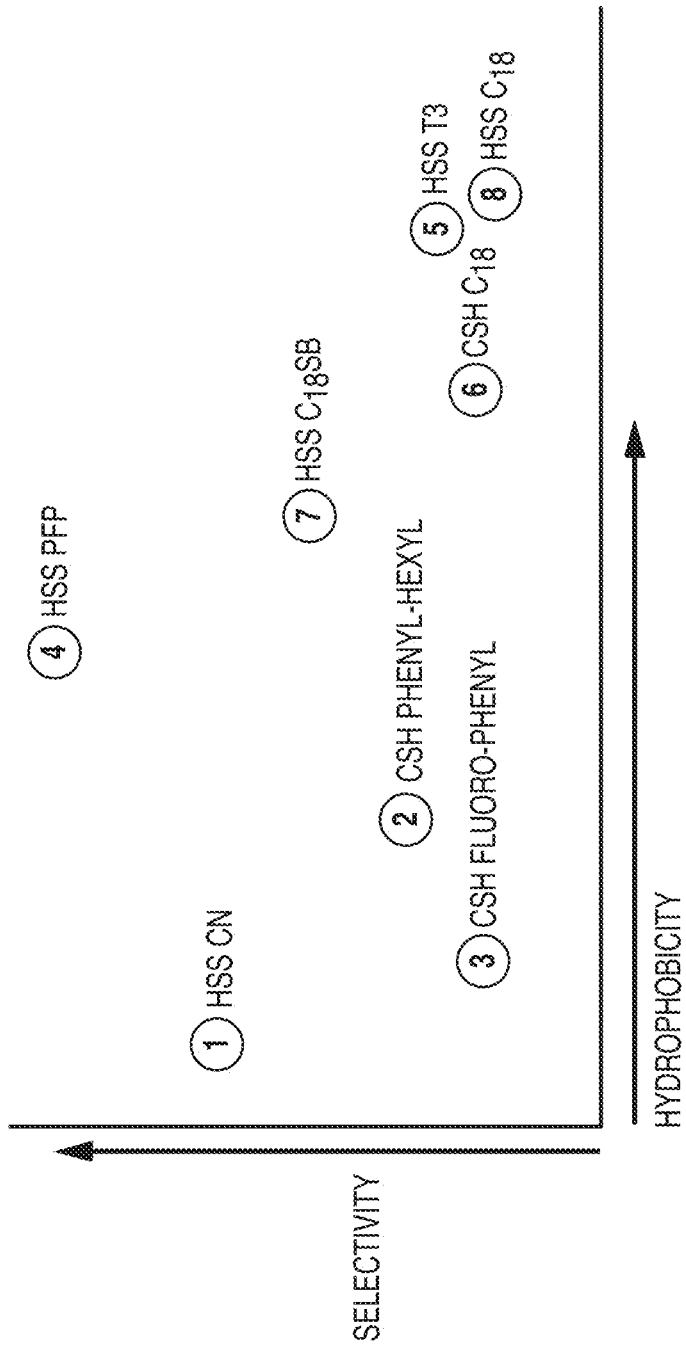
FIG. 3 is a graph showing selectivity versus hydrophobicity of several different reversed-phase columns, according to an illustrative embodiment of the technology.
Figure 5A:
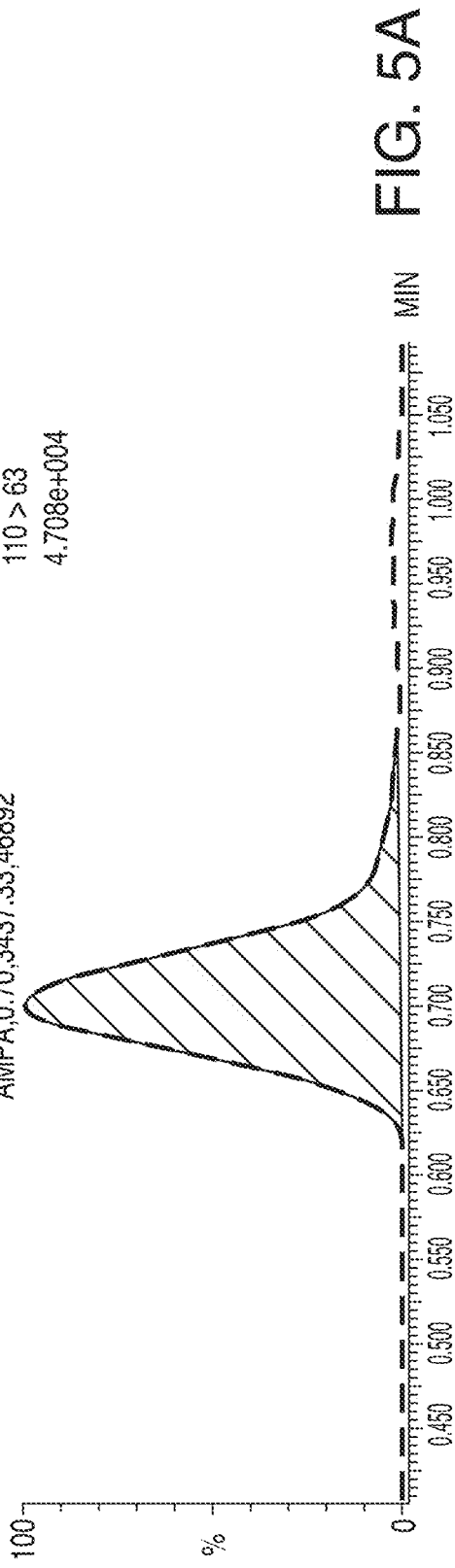
Figure 5B:
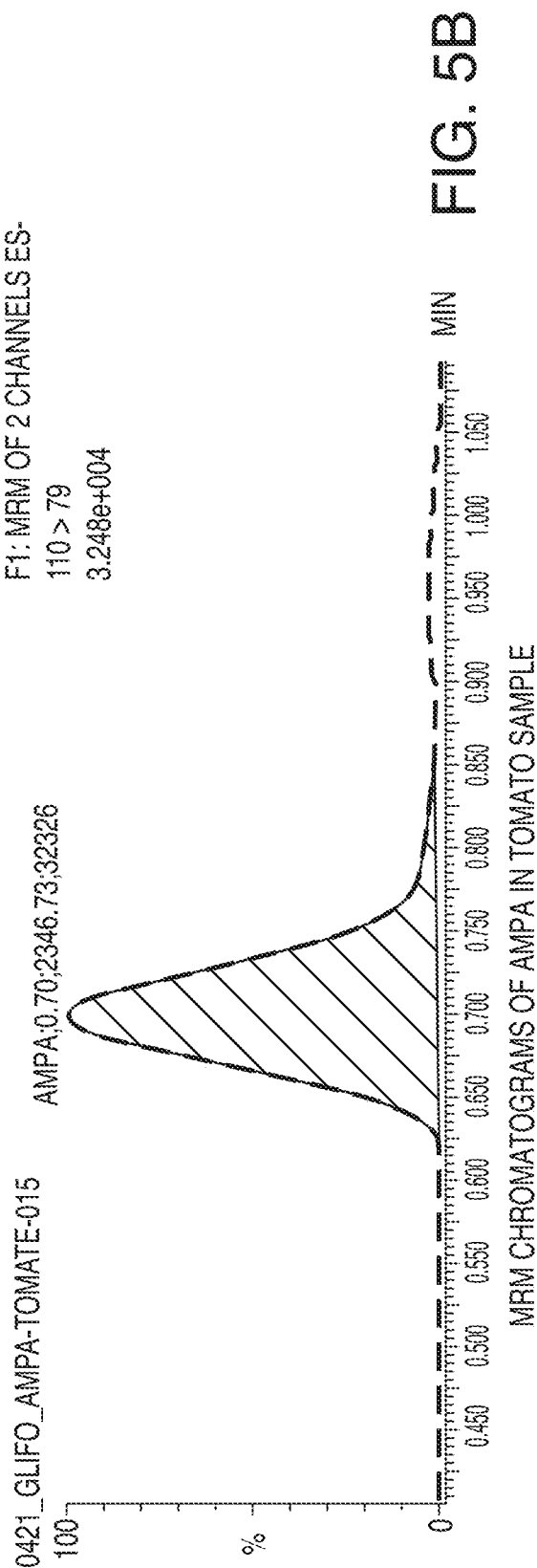
Figures 6A, 6B:
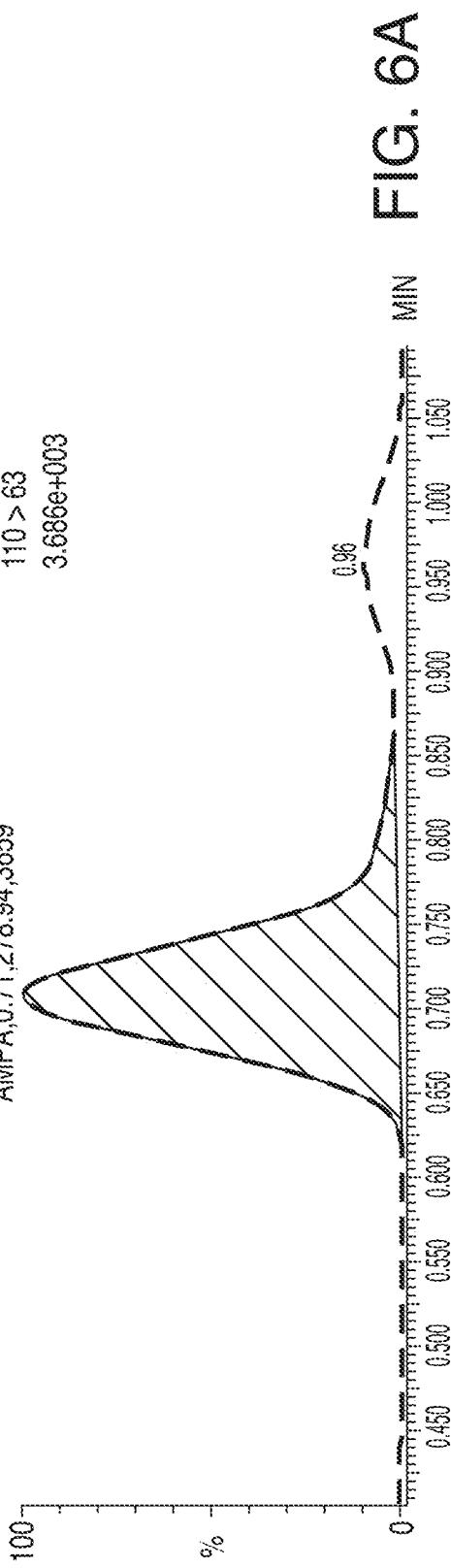
FIGS. 6A-D show MRM chromatograms of AMPA (FIGS. 6A and 6B) and glyphosate (FIGS. 6C and 6D) monitored in soybean samples, according to an illustrative embodiment of the technology.
Figure 6C:
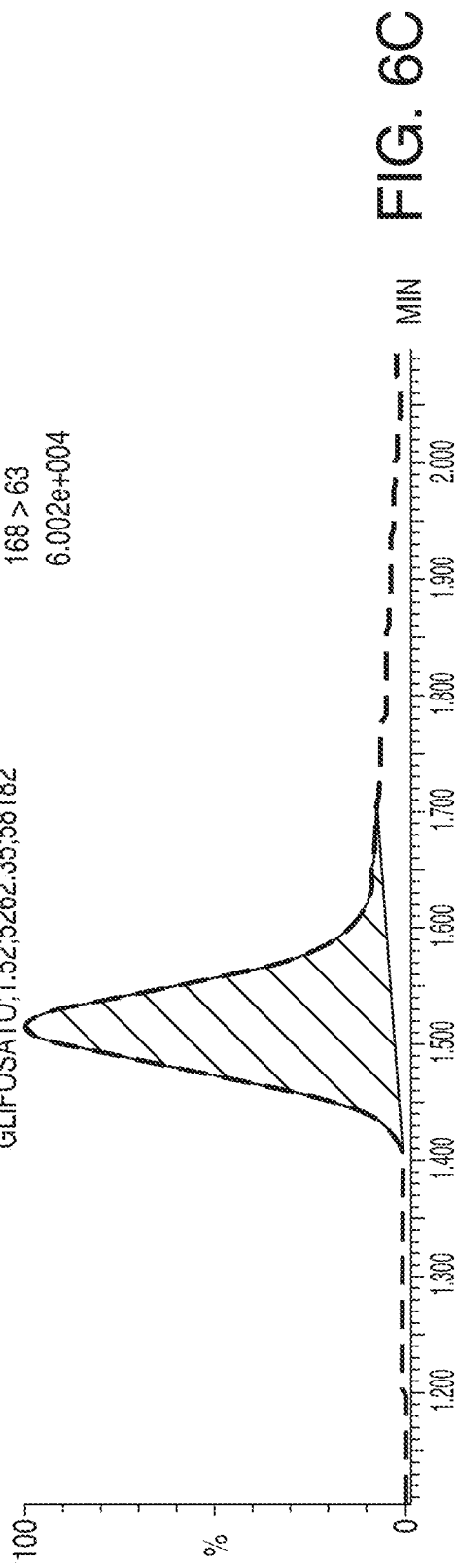
Figure 6D:
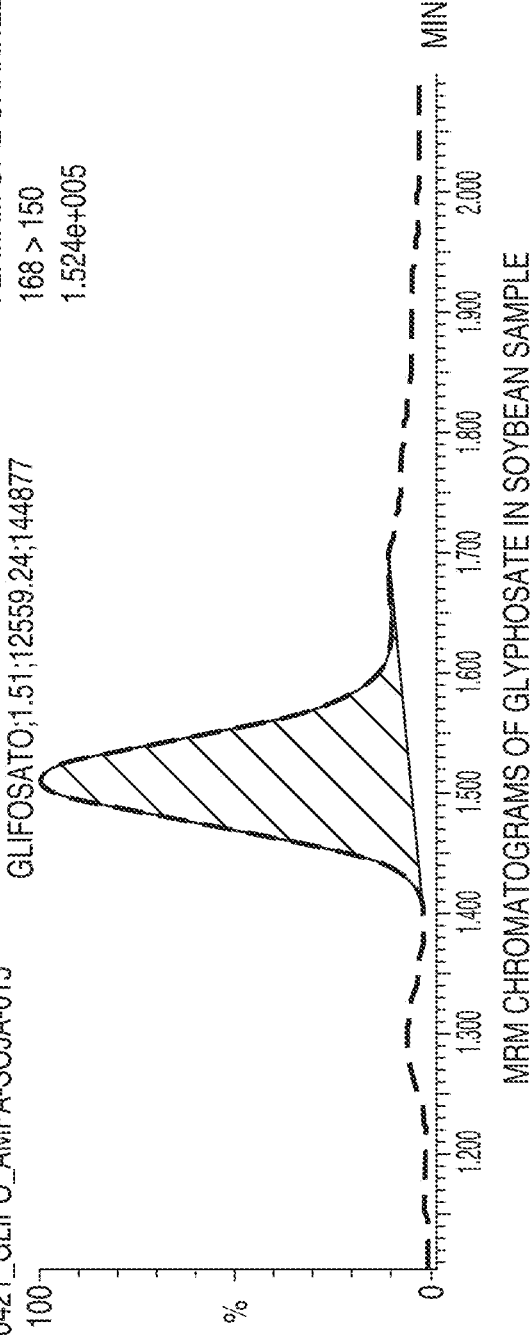
Figure 7A:
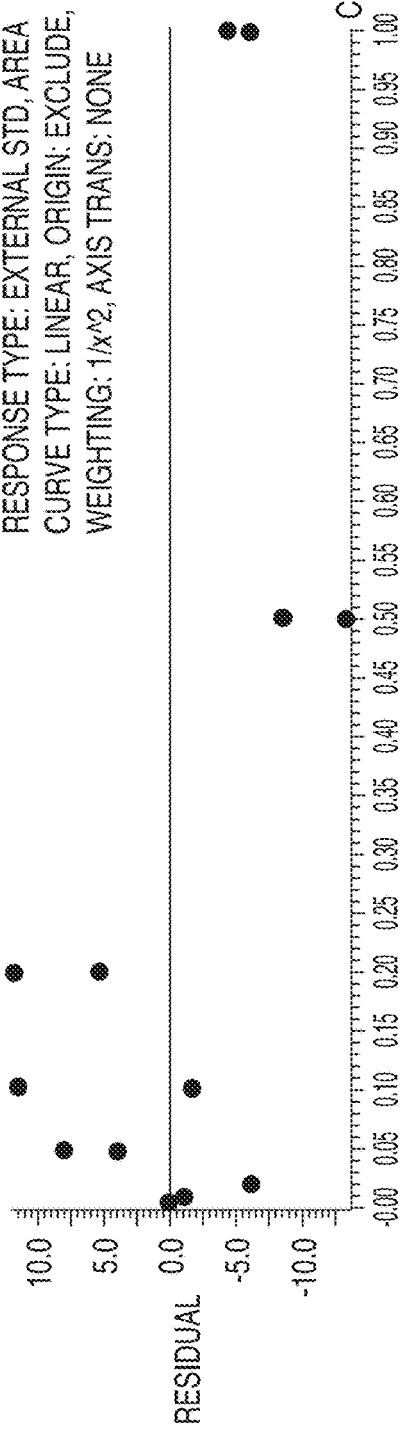
FIGS. 7A-D show the matrix matched calibration curves of AMPA (FIGS. 7A and 7B) and glyphosate (FIGS. 7C and 7D) in orange samples, according to an illustrative embodiment of the technology.
Figure 7B:
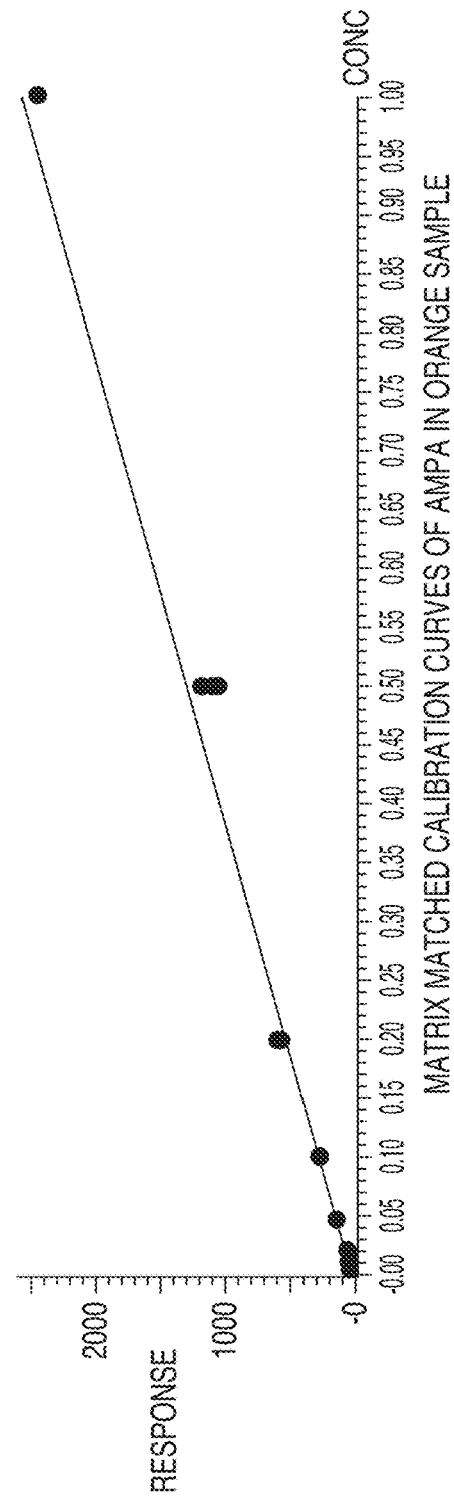
Figure 7C:
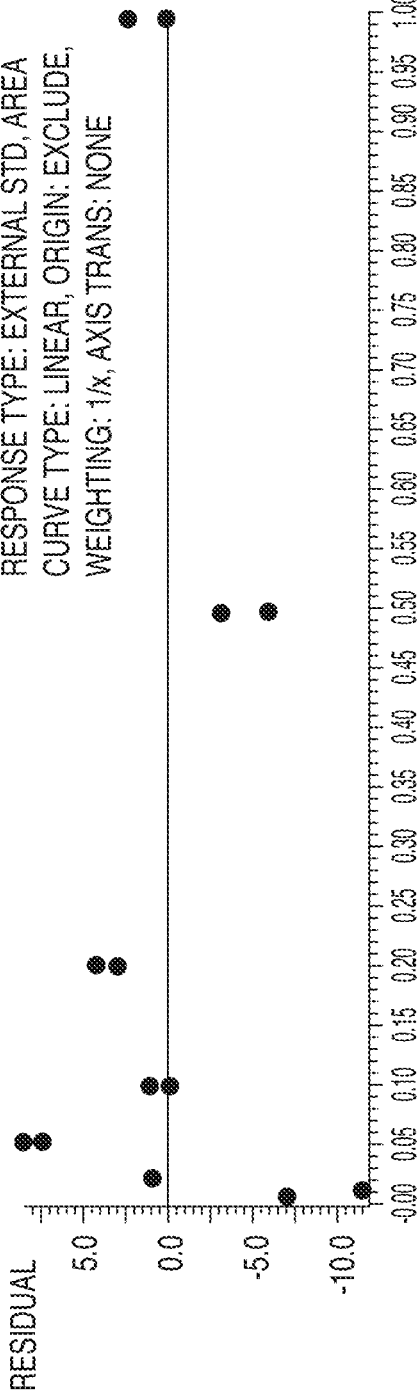
Figure 7D:
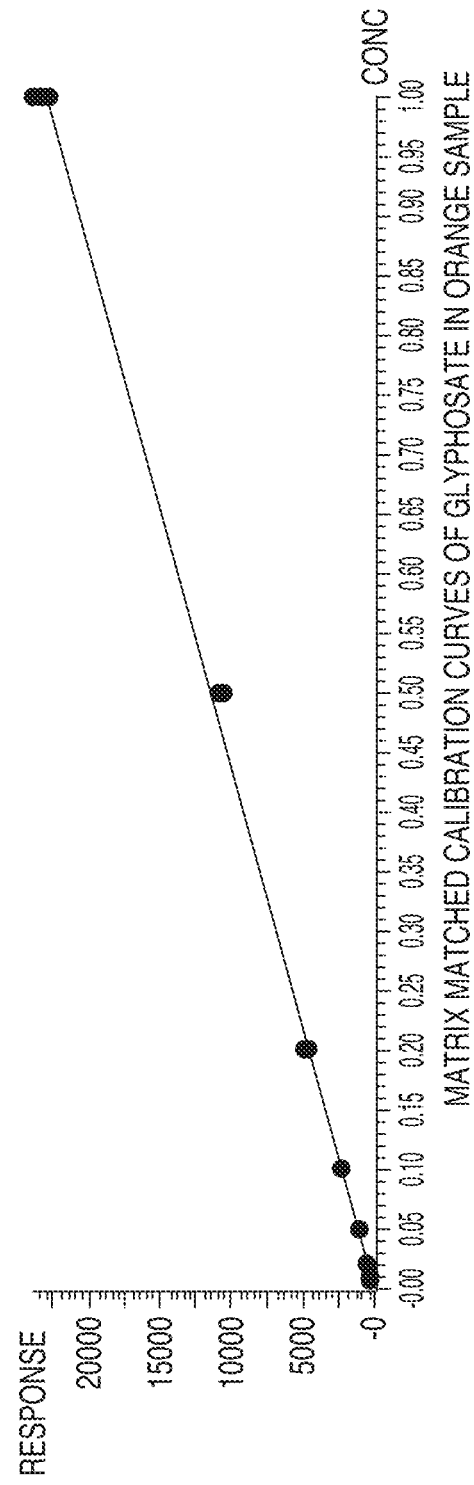
Figure 8A:
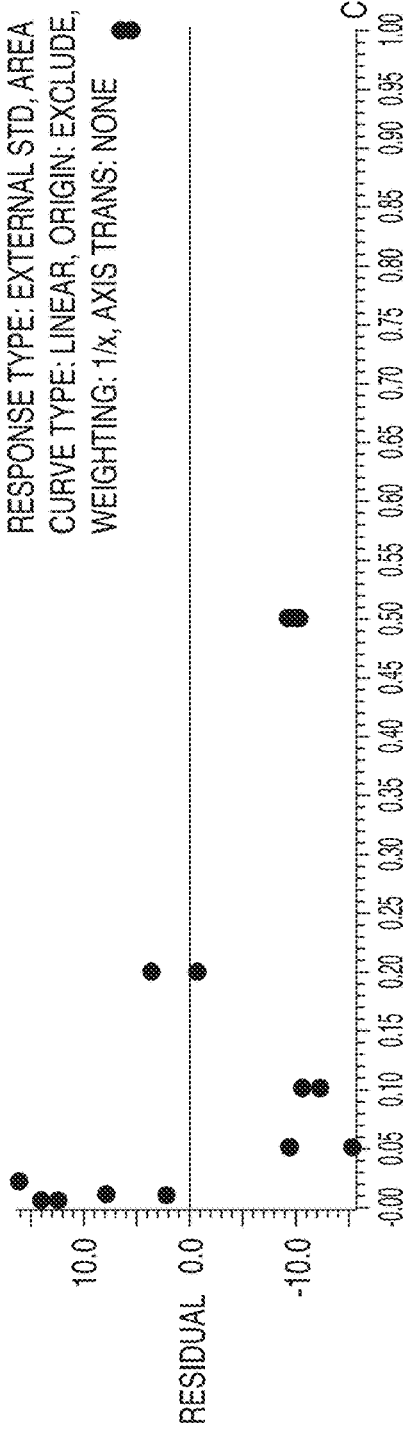
FIGS. 8A-D show the matrix matched calibration curves of AMPA (FIGS. 8A and 8B) and glyphosate (FIGS. 8C and 8D) in tomato samples, according to an illustrative embodiment of the technology.
Figure 8B:
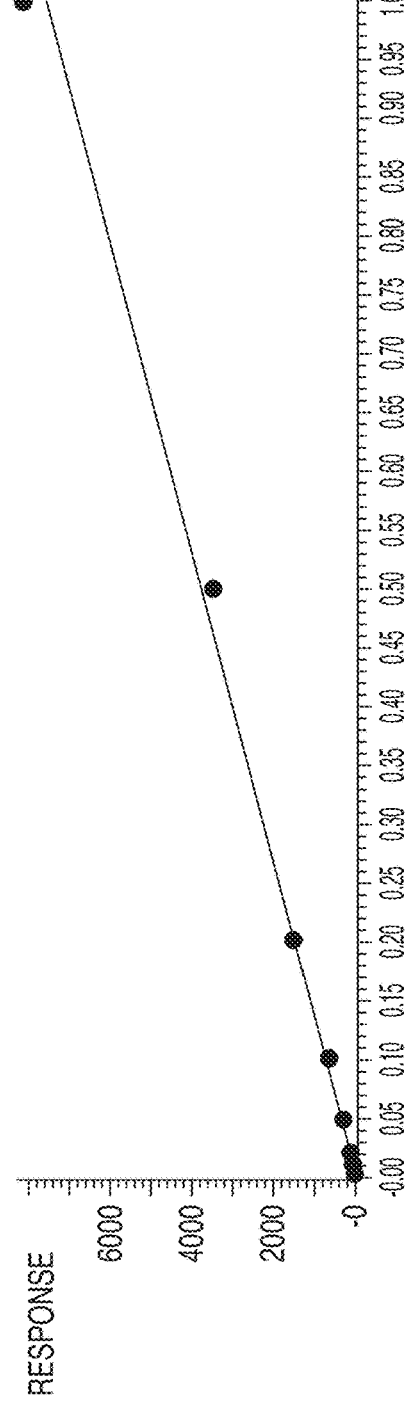
Figure 8C:
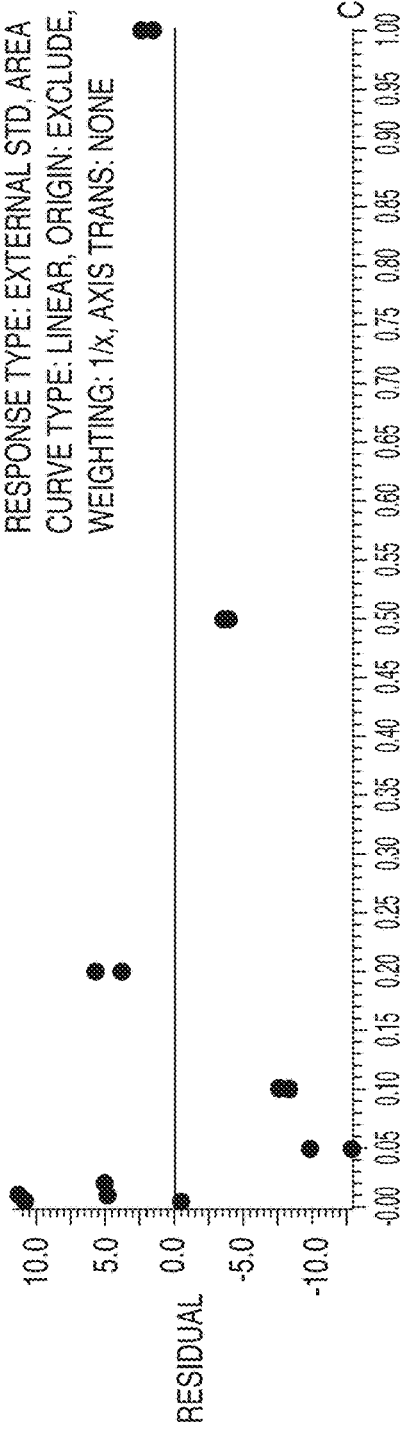
Figure 8D:
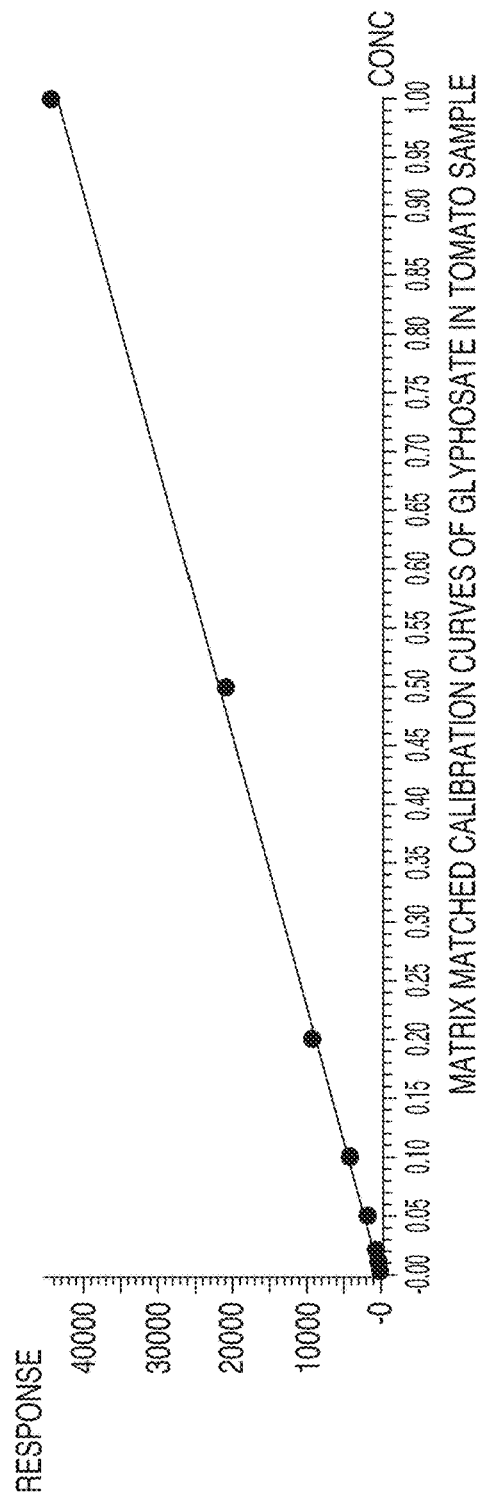
Figure 9A:
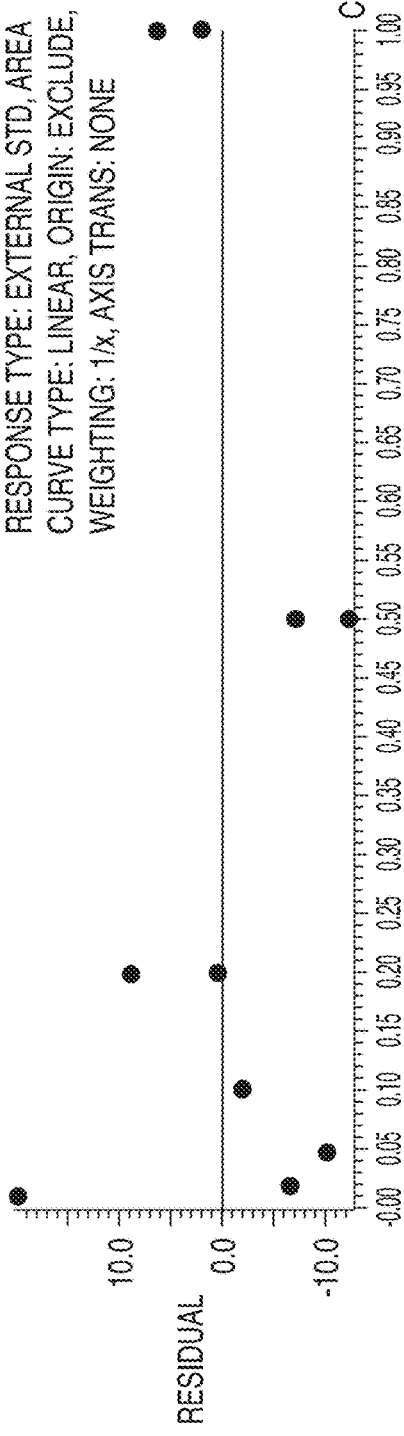
FIGS. 9A-9D show the matrix matched calibration curves of AMPA (FIGS. 9A and 9B) and glyphosate (FIGS. 9C and 9D) in soybean samples, according to an illustrative embodiment of the technology.
Figure 9B:
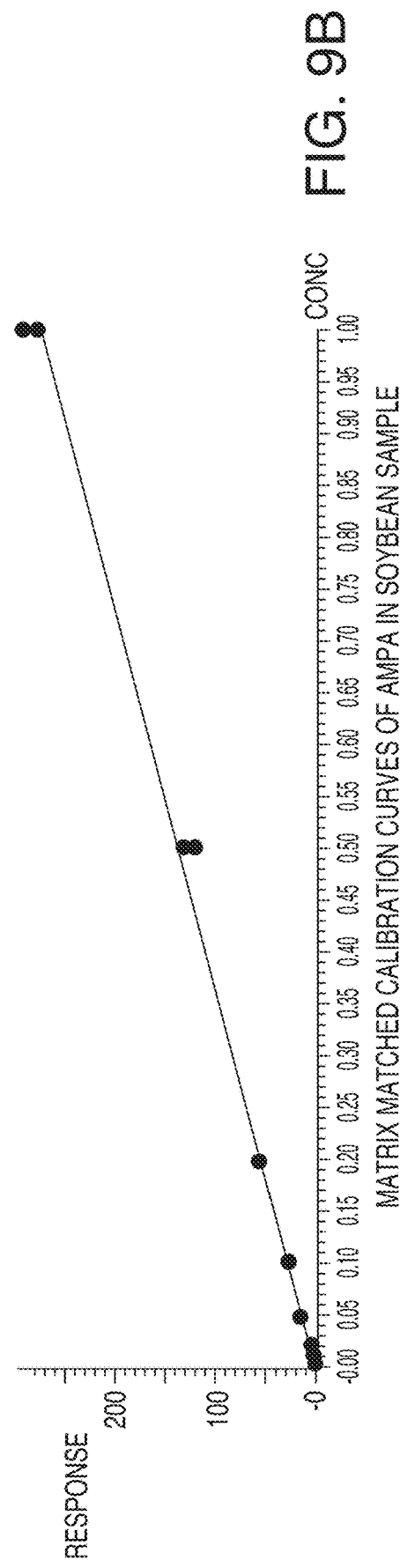
Figure 9C:
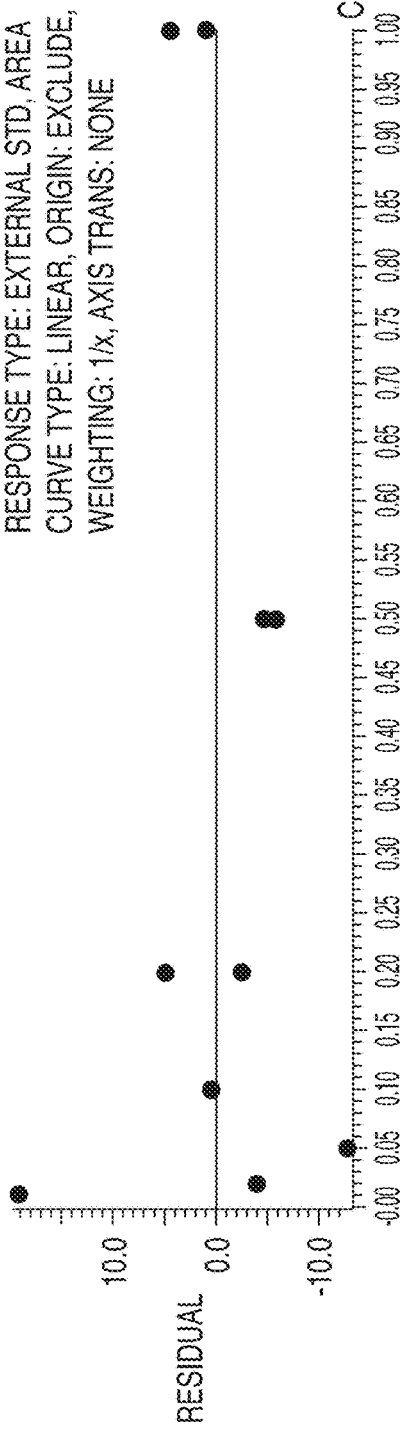
Figure 9D:
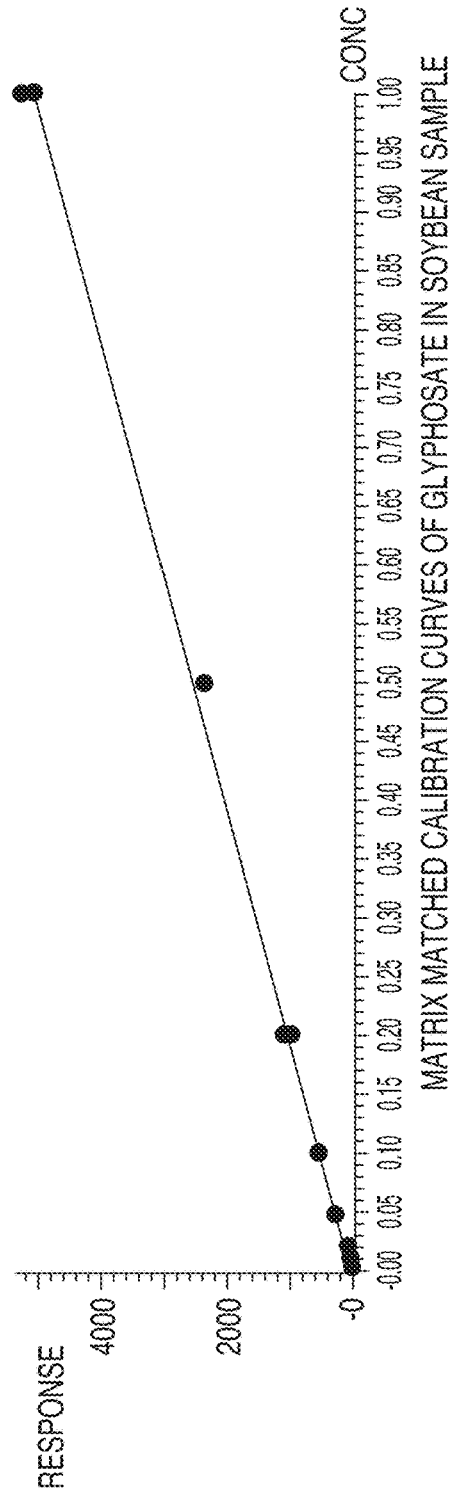

The use of the CSH particle in a reversed phase column showed retention of polar compounds, which was not achieved when other reversed-phase particle technologies were used, for example HSS (High Strength Silica), PFP (pentafluorophenyl), and BEH phenyl columns, using the same methodology as described herein. As shown in FIG. 3, the CSH fluoro-phenyl column is less hydrophobic in comparison with other reversed-phase columns. Note that the HSS PFP column (column number 4 in FIG. 3) shows the same functional group. However, it is more hydrophobic and does not retain the compounds glyphosate and/or AMPA. It was surprising that the use of the same functional group on a charged surface hybrid particle was able to retain the glyphosate and/or AMPA compounds, which were not retained on the HSS PFP column having the same functional group without the charged surface hybrid particle.

Referring back to FIG. 2, the reversed-phase chromatography column 215 can have any inner diameter that allows for the efficient separation of glyphosate and/or AMPA. The inner diameter of the chromatography column 215 can be, for example, 0.05 mm, 0.075 mm, 0.1 mm, 0.2 mm, 0.3 mm, 0.4 mm, 0.5 mm, 0.6 mm, 0.7 mm, 0.8 mm. 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, or 3 mm. These values can be used to define a range. In some embodiments, the inner diameter of the reversed-phase chromatography column 215 is 2.1 mm.

Similarly, the reversed-phase chromatography column 215 can have any length that allows for the separation of glyphosate and/or AMPA. The length can be, for example, about 5 mm, 10 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 115 mm, 120 mm, 125 mm 150 mm, 200 mm, 250 mm, or 300 mm. These values can be used to define a range. In some embodiments, the length of the reversed-phase chromatography column 215 is 100 mm.

The reversed-phase chromatography system 200 can have a detector 220 positioned downstream of the column 215. The detector 220 can be used to detect the glyphosate and/or AMPA eluting from the reversed-phase chromatography column 215. The detector 220 can be a mass spectrometer. In some embodiments, the detector 220 is a tandem mass spectrometer (MS/MS).

A data acquisition module 225 can be in communication with the detector 220. The data acquisition module 225 can be used, for example, to gather/collect and analyze data received from the detector 125. The data acquisition module 225 can be a computer having software installed to collect and analyze the data.

Referring back to FIG. 1, the sample and mobile phase eluent (combined flow stream) are flowed 120 through the reversed-phase chromatography column (e.g., column 215 of FIG. 2). The glyphosate and/or AMPA are substantially resolved and retained on the column. In some embodiments, the glyphosate and/or AMPA are separated in less than about 2 minutes. In some embodiments, the AMPA is separated in less than about 1 minute.

The mobile phase eluent can have a flow rate between about 0.2 to about 1.0 mL/min. The mobile phase eluent flow rate can be about 0.2 mL/min, 0.3 mL/min, 0.4 mL/min, 0.5 mL/min, 0.6 mL/min, 0.7 mL/min, 0.8 mL/min, 0.9 mL/min, or 1.0 mL/min. These values can be used to define a range. In some embodiments the flow rate of the mobile phase eluent is about 0.40 mL/min.

In some embodiments, the reversed-phase chromatography method and chromatography system is operated under isocratic conditions. In this way, the composition of the mobile phase eluent is kept constant and uniform during the entire run time of the chromatography method.

The glyphosate and/or AMPA are detected 125 using a detector or multiple detectors, for example, detector 220 of FIG. 2. The detector can be used to detect the glyphosate and/or AMPA eluting from the reversed-phase chromatography column. The detector can be a mass spectrometer. Due to the difficulty in determination of glyphosate and AMPA at low residue levels, its amphoteric character, low molecular mass, and lack of chemical groups for detection, tandem mass spectrometry (MS/MS) can be used due to its robustness in the monitoring of selected reactions (selected reaction monitory (SRM)/multiple reaction monitoring (MRM)), resulting in increased sensitivity and selectivity. In some embodiments, an iontrap, time of flight (TOF) and/or Orbitrap™ (commercially available from Thermo Fisher Scientific, Inc., US) detector can be used.

In one aspect, the technology relates to a kit. The kit includes a reversed-phase chromatography system that includes a reversed-phase column having a stationary phase material contained inside the column. The stationary phase material can include a phenyl functional group, a fluoro-phenyl functional group, or a phenyl-hexyl functional group. The chromatography system can also include a detector. The chromatography system provided as part of the kit can be, for example, the chromatography system, or any part or embodiment thereof, of FIG. 2.

The kit also includes instructions. The instructions are for (a) obtaining a sample comprising at least one of glyphosate or AMPA in a sample matrix; (b) introducing the sample to the reversed-phase chromatography system; (c) flowing the sample with a mobile phase eluent through the reversed-phase column, wherein the glyphosate or AMPA is substantially resolved and retained, the mobile phase eluent having a pH between about 1.5 to about 2.5; and (d) detecting the glyphosate or AMPA using a detector. The instructions provided in the kit can include instructions related to any embodiment described herein. In some embodiments, the sample includes only glyphosate. The sample can include only AMPA In some embodiments, the sample includes both glyphosate and AMPA.

In another aspect, the technology relates to a kit that includes a reversed-phase chromatography column that has a stationary phase material contained inside the column. The stationary phase material can include a phenyl functional group, a fluoro-phenyl functional group, or a phenyl-hexyl functional group. The kit also includes instructions that are contained on a computer readable medium for operating the reversed-phase chromatography system. The instructions can, for example, be used in conjunction with a computer that is in communications with the chromatography system and controls/automates the method described herein (e.g., the flow rates, column temperature, sample introduction, etc.), as is known to those of skill in the art. The instructions automate inserting a sample into a mobile phase eluent, flowing the sample with the mobile phase eluent through the reversed-phase chromatography column, and detecting components of the sample. The kit also includes a vial containing the mobile phase eluent acidified to a pH of about 2. The instructions provided in the kit can include instructions related to any embodiment described herein.

Example 1—Separation of Glyphosate and AMPA from Orange, Tomato, and Soybean Samples Glyphosate and AMPA standards were provided by a partner. For each compound, around 30 mg of powder were received in amber flasks. Ten milligrams of each of glyphosate and AMPA were weighed in a conical centrifuge tube and 10 mL of methanol were added to produce a stock solution of 1000 mg/L each. Work mix solutions of glyphosate and AMPA were prepared in concentrations of 100 mg/L, 10 mg/L, and 1 mg/L in 10 mL of methanol/water 1:1.

Orange, tomato, and soybean samples were purchased from local supermarkets.

Ten grams of sliced orange and tomato were weighed and 10 mL of methanol with 1% formic acid was added, samples were shaken for 5 minutes at 4500 RPM. An aliquot of 1 mL was transferred to another tube and diluted with 1 mL of ultrapure water. Those diluted samples were filtered (0.22 μm GPH) and injected. For soybean samples, 2 g were weighed and 10 mL of ultrapure water was added, mixtures were shaken for 30 seconds and the same procedure as described above was performed. Similar procedures can be followed for other non-water samples.

The liquid chromatography conditions are shown in Table 1 and the MS conditions are shown in Table 2.

TABLE 1

| Liquid Chromatography Conditions | |
|---|---|
| LC System | ACQUITY ® UPLC ® I-Class (commercially available from Waters Technologies Corporation, Milford, MA) |
| Column | XSelect ® CSH Fluoro Phenyl 2.1 × 100 mm, 5 μm (commercially available from Waters Technologies Corporation, Milford, MA) |
| Colum Temperature | 40° C. |
| Injection Volume | 2 μL |
| Flow Rate | 0.400 mL/min |
| Mobile Phase A | $H_2O$ + 3% acetic acid |
| Mobile Phase B | Methanol + 3% acetic acid |
| Weak needle wash | Methanol + 3% acetic acid |
| Strong needle wash | Methanol + 3% acetic acid |

TABLE 1-continued

| Liquid Chromatography Conditions | |
|---|---|
| Seal wash | 90/10 water/acetonitrile |
| Isocratic Conditions | A/B 60:40 v/v |

TABLE 2

| MS Conditions | |
|---|---|
| MS System | Xevo ® TQ-S (commercially available from Waters Technologies Corporation, Milford, MA) |
| Ionization Mode | ESI– |
| Capillary Voltage | 3 kV |
| Dessolvation Temperature | 500° C. |
| Dessolvation Gas Flow | 1000 L/Hr |
| Source Temperature | 150° C. |

Glyphosate and AMPA were separated on an XSelect® CSH Fluoro Phenyl column (commercially available from Waters Technologies Corporation, Milford, Mass.) in under two minutes, for which retention times in isocratic conditions were respectively 1.52 and 0.70 min. For each analyte two MRM transitions were monitored. Therefore, this method is applicable to a wide variety of matrices, such as fruits, vegetables, and soil samples. FIGS. 4A-D, 5A-D, and 6A-D show MRM chromatograms of glyphosate and AMPA monitored in orange, tomato, and soybean samples, respectively.

Linearity was studied with eight different levels of matrix-matched standard calibrations in orange and tomato samples and seven different levels in soybean sample. Concentration ranges of the calibration levels in orange and tomato were between 0.005 and 1.0 mg/kg and in soybean between 0.01 and 1.0 mg/kg. The linearity of the analytical response for both analytes was acceptable with correlation coefficients ($R^2$) greater than 0.992. FIGS. 7A-D, 8A-D, and 9A-D show the matrix matched calibration curves of glyphosate and AMPA in orange, tomato, and soybean samples, respectively.

Recovery of the method was evaluated by spiking reference standards in samples and quantifying against the matrix-matched calibration curve. Orange, tomato, and soybean samples were pre-spiked with glyphosate and AMPA in concentrations of 0.074 mg/kg and 0.7 mg/kg in triplicates. Samples were extracted and quantified against the matrix matched calibration curves. Recoveries were calculated using TargetLynx™ software (commercially available from Waters Technologies Corporation, Milford, Mass.).

The recoveries fell within the acceptable tolerance of 70% to 120% range (DG SANTE/11945/2015) in all samples. The relative standard deviations (RSDs) for both compounds in orange, tomato, and soybean were less than 20%. See Table 3.

TABLE 3

| Percent Recovery | | | | | | |
|---|---|---|---|---|---|---|
| | % Recovery | | | | | |
| Concentration | Orange | | Tomato | | Soybean | |
| (mg/kg) | AMPA | Glyphosate | AMPA | Glyphosate | AMPA | Glyphosate |
| 0.07 | 98.9 | 96.8 | 95.7 | 84.3 | 81.9 | 101.9 |
| 0.7 | 93.9 | 97.6 | 86.0 | 83.1 | 103.2 | 105.6 |

This technology presents a method for the extraction and determination of polar pesticides, in particular glyphosate and AMPA, in orange, tomato, and soybean samples by a short-HPLC-MS/MS. The combination of simple sample extraction with chromatography on a column having a stationary phase with a phenyl functional group and sensitive and selective detection using tandem mass spectrometry produce a method for the determination of such challenging analytes in complex matrices and at low levels.

Example 2—Separation of Glyphosate and AMPA from Water Matrix Sample

In general, the method described in Example 1 can also be applied to water matrix samples, for example, samples from river water, ocean water, ground water, and tap water. However, when working with water matrix samples, the extraction step performed when working with samples such as fruit and vegetables, is not necessary. A water matrix sample can be filtered and injected straight into a chromatography system without performing an extraction step. However, injecting a water matrix sample straight into a chromatography system can result in decreased chromatographic resolution and poor peak shape due to the interaction of glyphosate with metal components (e.g., metal tubing or column). Therefore, when working with a water matrix sample, the sample is diluted 1:1 with methanol and 1% formic acid, the same solution used to extract non-water matrix samples. Diluting water matrix samples with methanol and 1% formic acid increases chromatographic resolution and results in better peak shape than when water matrix samples are injected directly into a chromatographic system without the methanol and 1% formic acid dilution step. Following dilution of the water matrix sample with methanol and 1% formic acid, the separation and detection method of Example 1 can be followed.

Those skilled in the art will recognize, or be able to ascertain using no more than routine experimentation, numerous equivalents to the specific procedures described herein. Such equivalents were considered to be within the scope of this technology and are covered by the following claims. The contents of all references, issued patents, and published patent applications cited throughout this application are hereby incorporated by reference.

What is claimed is:

1. A reversed-phase chromatography method for the determination of glyphosate or AMPA in a sample, the reversed-phase chromatography method comprising:
    obtaining the sample comprising at least one of glyphosate or AMPA in a sample matrix;
    introducing the sample to a reversed-phase chromatography system comprising a reversed-phase column having a stationary phase material contained inside the column, the stationary phase material comprising a phenyl functional group;
    flowing the sample with a mobile phase eluent through the reversed-phase column, wherein the at least one of glyphosate or AMPA is substantially resolved and retained, the mobile phase eluent having a pH between about 1.5 to about 2.5; and
    detecting the at least one of glyphosate or AMPA using a detector.

2. The reversed-phase chromatography method of claim 1, wherein the pH of the mobile phase eluent is about 2.

3. The reversed-phase chromatography method of claim 1, wherein the stationary phase material comprises a fluorophenyl functional group.

4. The reversed-phase chromatography method of claim 1, wherein the stationary phase material comprises inorganic/organic hybrid particles.

5. The reversed-phase chromatography method of claim 1, wherein the stationary phase material comprises ethylene bridged hybrid particles.

6. The reversed-phase chromatography method of claim 1, wherein obtaining the sample comprises extracting at least one of glyphosate or AMPA from food or soil to form an extract, wherein the extract is used as the sample.

7. The reversed-phase chromatography method of claim 6, wherein the at least one of glyphosate or AMPA is extracted using an organic solvent acidified with formic acid.

8. The reversed-phase chromatography method of claim 1, wherein the sample comprises glyphosate and AMPA.

9. The reversed-phase chromatography method of claim 1, wherein the mobile phase eluent comprises acetic acid.

10. The reversed-phase chromatography method of claim 1, wherein the at least one of glyphosate or AMPA are separated in less than two minutes.

11. The reversed-phase chromatography method of claim 1, wherein the AMPA is separated in less than one minute.

12. The reversed-phase chromatography method of claim 1, wherein the detector is a mass spectrometer.

13. The reversed-phase chromatography method of claim 1, wherein the mobile phase eluent has a flow rate between about 0.2 to about 1.0 mL/min.

14. The reversed-phase chromatography method of claim 1, wherein the mobile phase eluent has a flow rate of about 0.40 mL/min.

15. The reversed-phase chromatography method of claim 1, wherein the reversed-phase chromatography system is operated under isocratic conditions.

16. The reversed-phase chromatography method of claim 1, wherein the sample is a fruit sample, a vegetable sample or a soil sample.

17. A kit comprising:
    (i) a reversed-phase chromatography system comprising
        (a) a reversed phase column having a stationary phase material contained inside the column, the stationary phase material comprising a phenyl functional group, and
        (b) a detector; and
    (ii) instructions contained in a computer readable medium for operating a reversed-phased chromatography system, wherein the instructions automate
        (a) introducing a sample to the reversed-phase chromatography system, the sample comprising at least one of glyphosate or AMPA;
        (b) flowing the sample with a mobile phase eluent through the reversed-phase column, wherein the at least one of glyphosate or AMPA is substantially resolved and retained, the mobile phase eluent having a pH between about 1.5 to about 2.5; and
        (c) detecting the at least one of glyphosate or AMPA using a detector.

18. A kit comprising:
    (i) a reversed-phase chromatography column having a stationary phase material contained inside the column, the stationary phase material comprising a phenyl functional group;
    (ii) instructions contained in a computer readable medium for operating a reversed-phased chromatography system, wherein the instructions automate
        inserting a sample into a mobile phase eluent;

flowing the sample with the mobile phase eluent through the reversed-phase chromatography column; and detecting components of the sample; and (iii) a vial containing the mobile phase eluent acidified to a pH of about 2.

\* \* \* \* \*